(12) United States Patent
Kim et al.

(10) Patent No.: US 9,864,893 B2
(45) Date of Patent: Jan. 9, 2018

(54) OPTICAL FINGERPRINT SENSOR

(71) Applicant: SILICON DISPLAY TECHNOLOGY, Gyeonggi-do (KR)

(72) Inventors: Ki Joong Kim, Gyeonggi-do (KR); Ji Ho Hur, Gyeonggi-do (KR); Soon Ho Choi, Gyeonggi-do (KR)

(73) Assignee: SILICON DISPLAY TECHNOLOGY, Gyeonggi-do (KR)

( * ) Notice: Subject to any disclaimer, the term of this patent is extended or adjusted under 35 U.S.C. 154(b) by 44 days.

(21) Appl. No.: 15/022,209

(22) PCT Filed: Sep. 17, 2014

(86) PCT No.: PCT/KR2014/008652
§ 371 (c)(1),
(2) Date: Mar. 16, 2016

(87) PCT Pub. No.: WO2015/041459
PCT Pub. Date: Mar. 26, 2015

(65) Prior Publication Data
US 2016/0224819 A1    Aug. 4, 2016

(30) Foreign Application Priority Data

Sep. 17, 2013 (KR) .................. 10-2013-0111575

(51) Int. Cl.
*G06K 9/00* (2006.01)
(52) U.S. Cl.
CPC ....... *G06K 9/00013* (2013.01); *G06K 9/0004* (2013.01)

(58) Field of Classification Search
CPC .................. G06K 9/00013; G06K 9/0004
See application file for complete search history.

(56) References Cited

U.S. PATENT DOCUMENTS

| | | | |
|---|---|---|---|
| 2007/0226015 A1 | 9/2007 | Lutnick et al. | |
| 2008/0316323 A1* | 12/2008 | Morita | A61B 5/0059 348/222.1 |
| 2009/0100265 A1* | 4/2009 | Tadokoro | G07C 9/00087 713/172 |

FOREIGN PATENT DOCUMENTS

| | | |
|---|---|---|
| KR | 10-2001-0094555 A | 11/2001 |
| KR | 10-2004-0081885 A | 9/2004 |
| KR | 10-2008-0088591 A | 10/2008 |
| KR | 10-2009-0053937 A | 5/2009 |

OTHER PUBLICATIONS

International Search Report for PCT/KR2014/008652 dated Oct. 22, 2014 from Korean Intellectual Property Office.

* cited by examiner

*Primary Examiner* — Phuoc Tran
(74) *Attorney, Agent, or Firm* — Lex IP Meister, PLLC

(57) ABSTRACT

The present invention relates to an optical fingerprint sensor which can comprise: a backlight unit for irradiating light; an uneven surface layer onto which the light from the backlight unit is irradiated; and a photosensor unit arranged between the backlight unit and the uneven surface layer so as to detect the light irradiated from the backlight unit and reflected from a user's fingerprint coming into contact with the uneven surface layer.

11 Claims, 5 Drawing Sheets

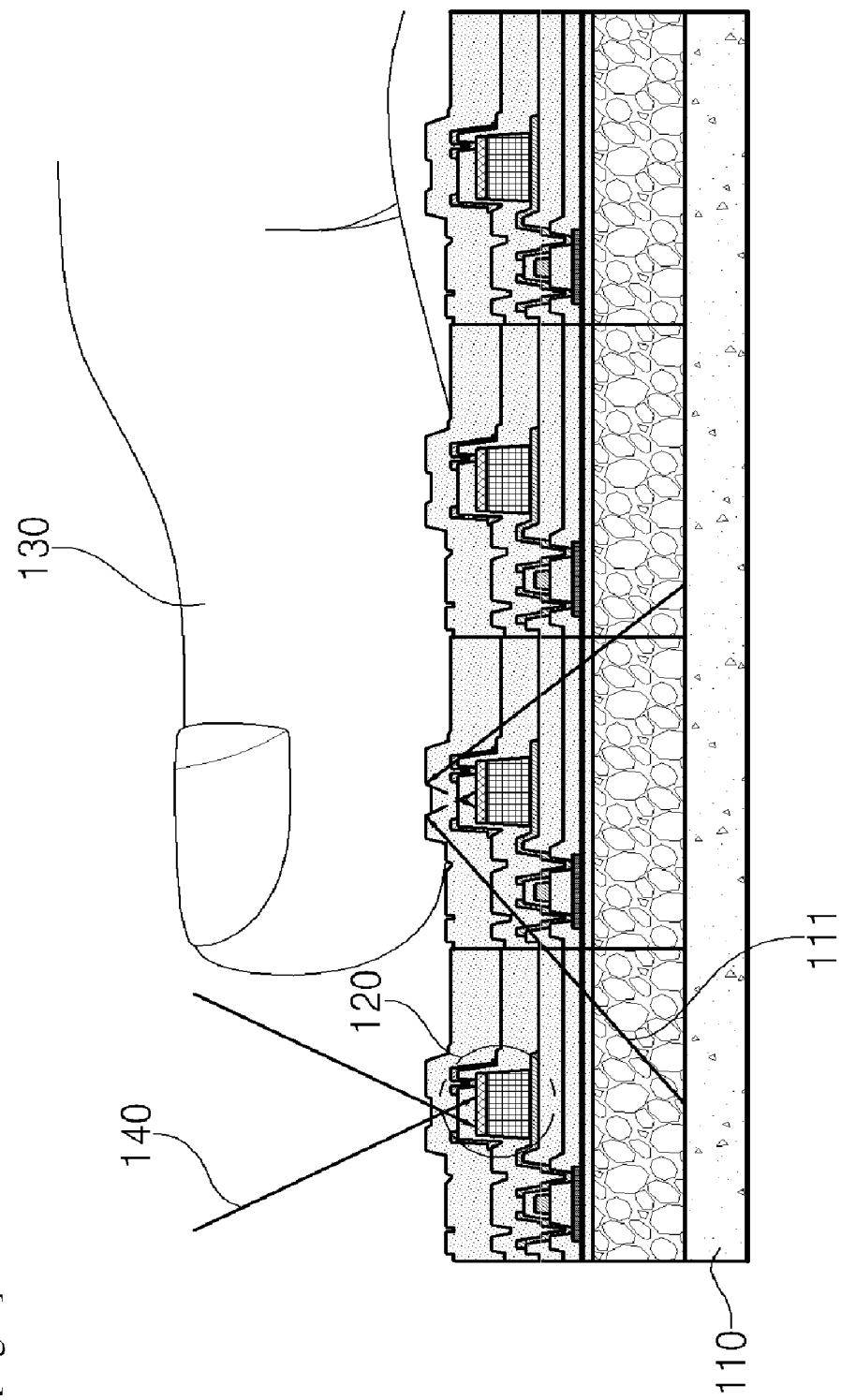
[Fig. 1]

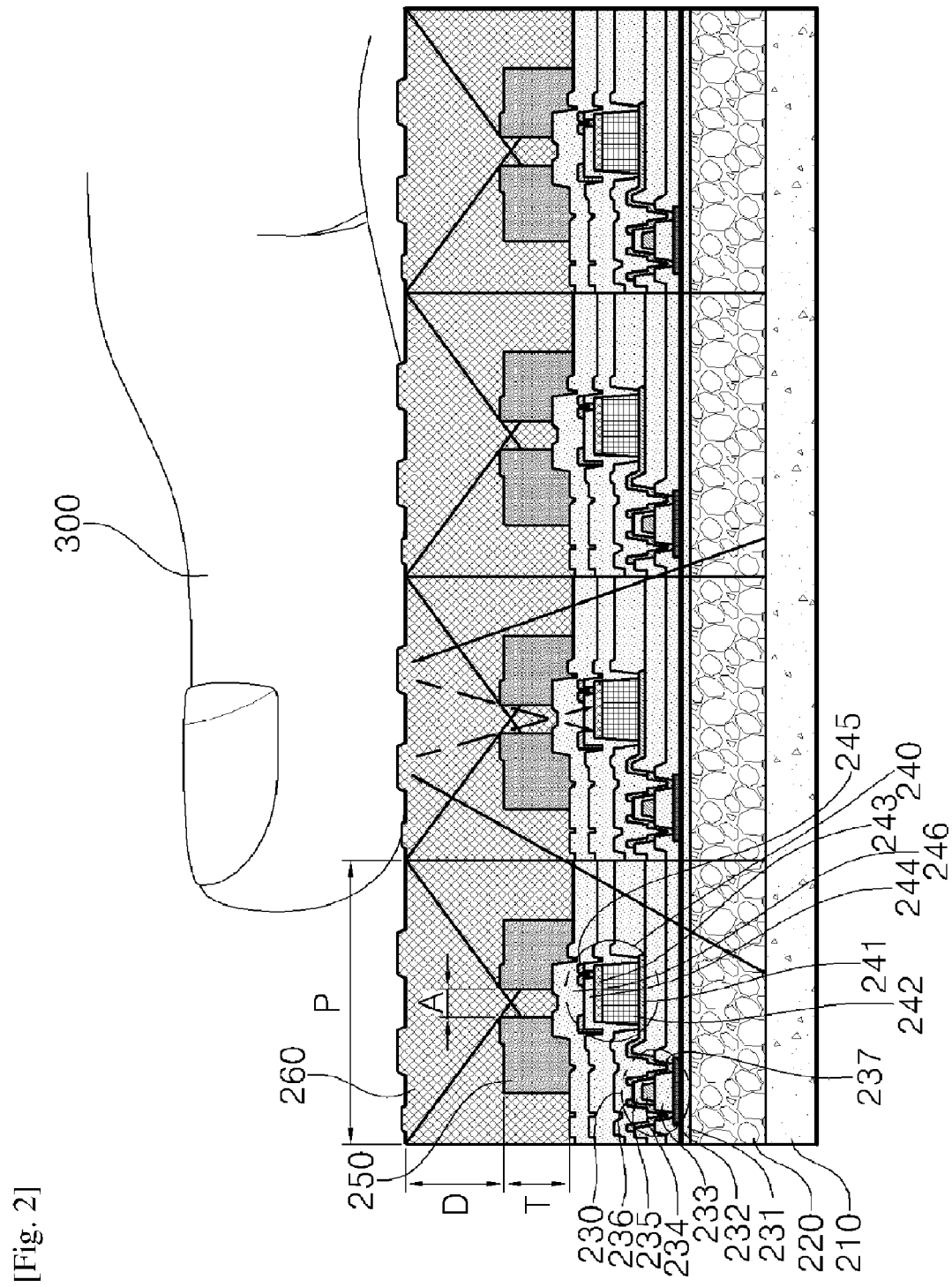
[Fig. 2]

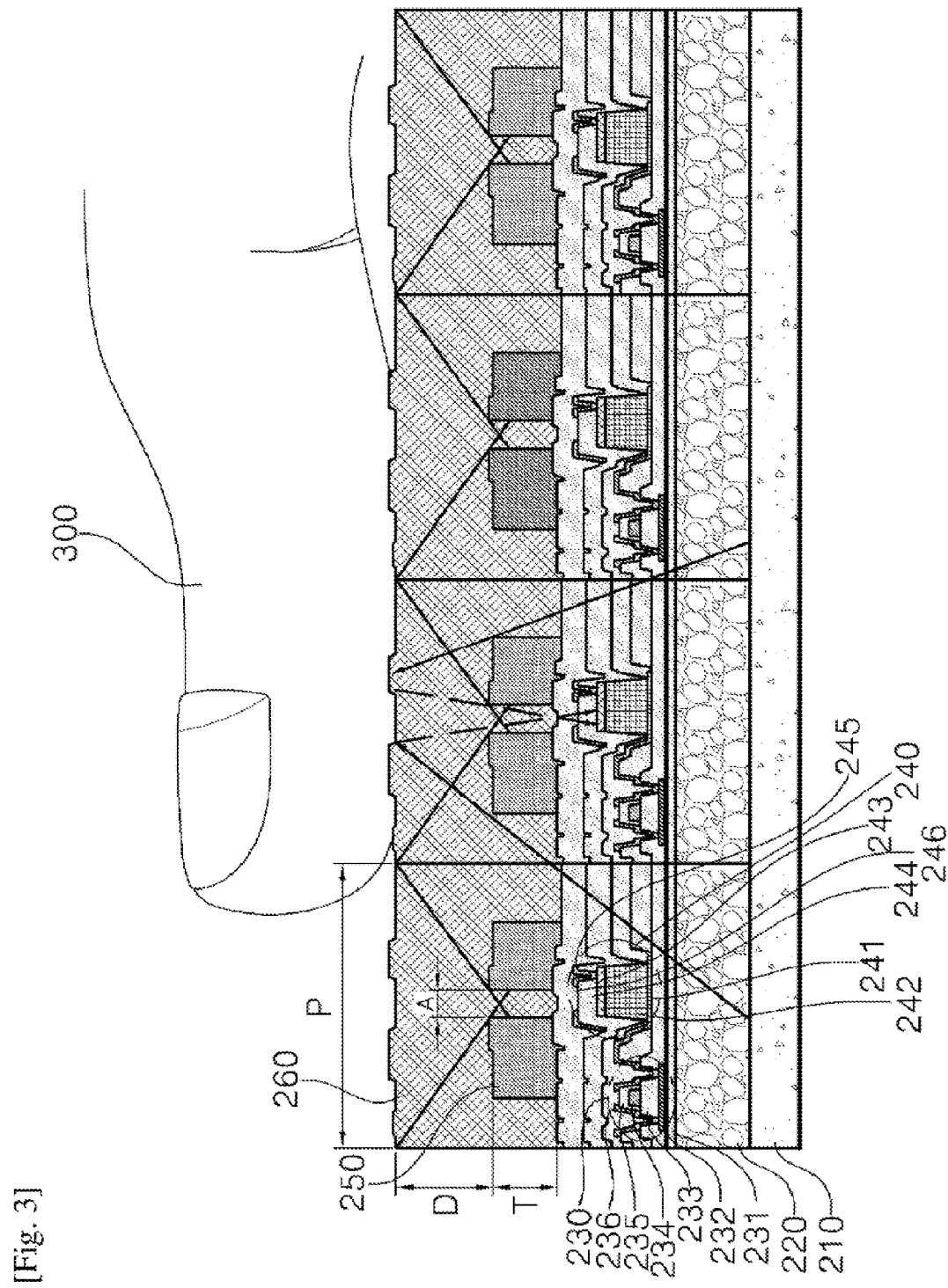
[Fig. 3]

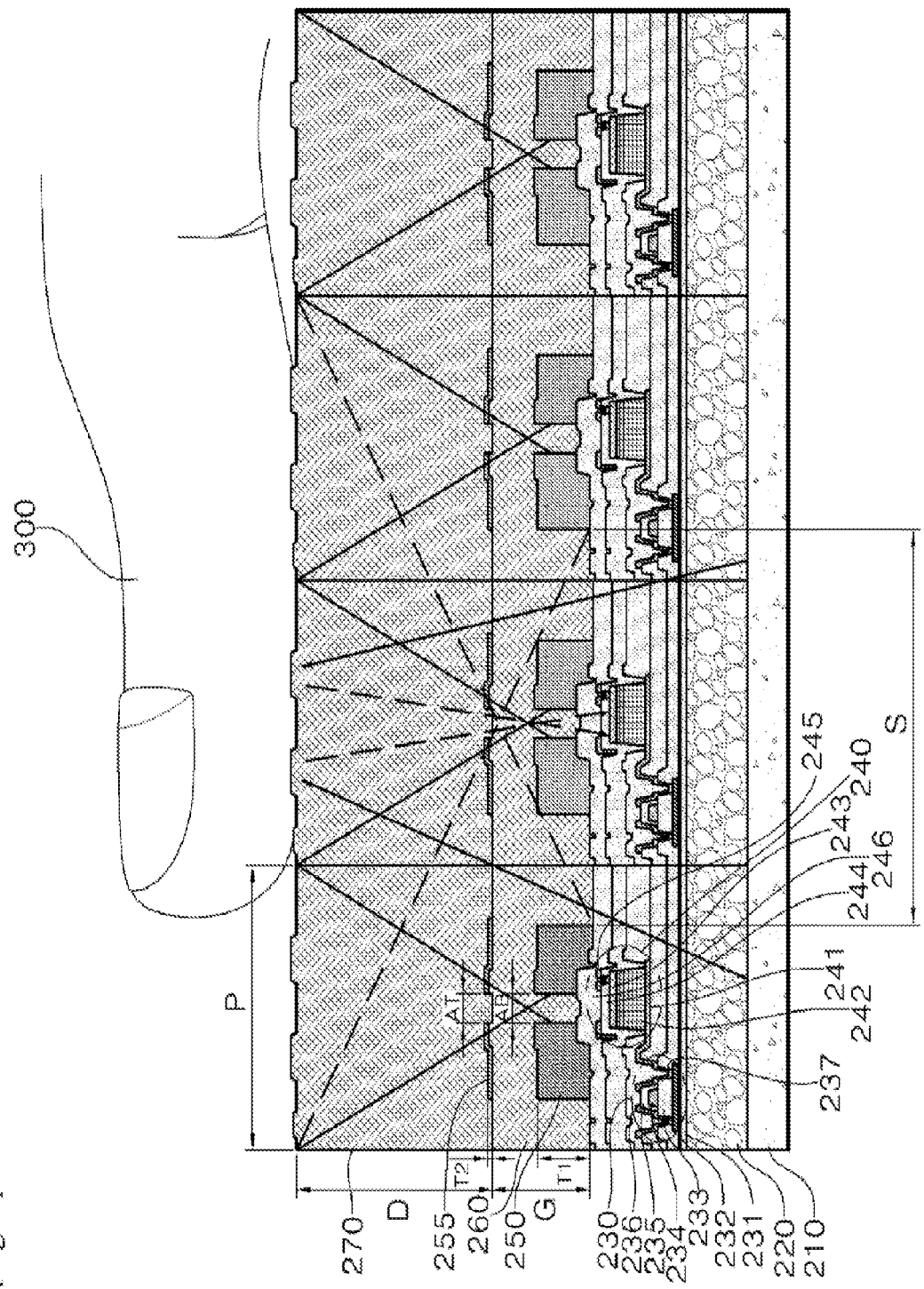
[Fig. 4]

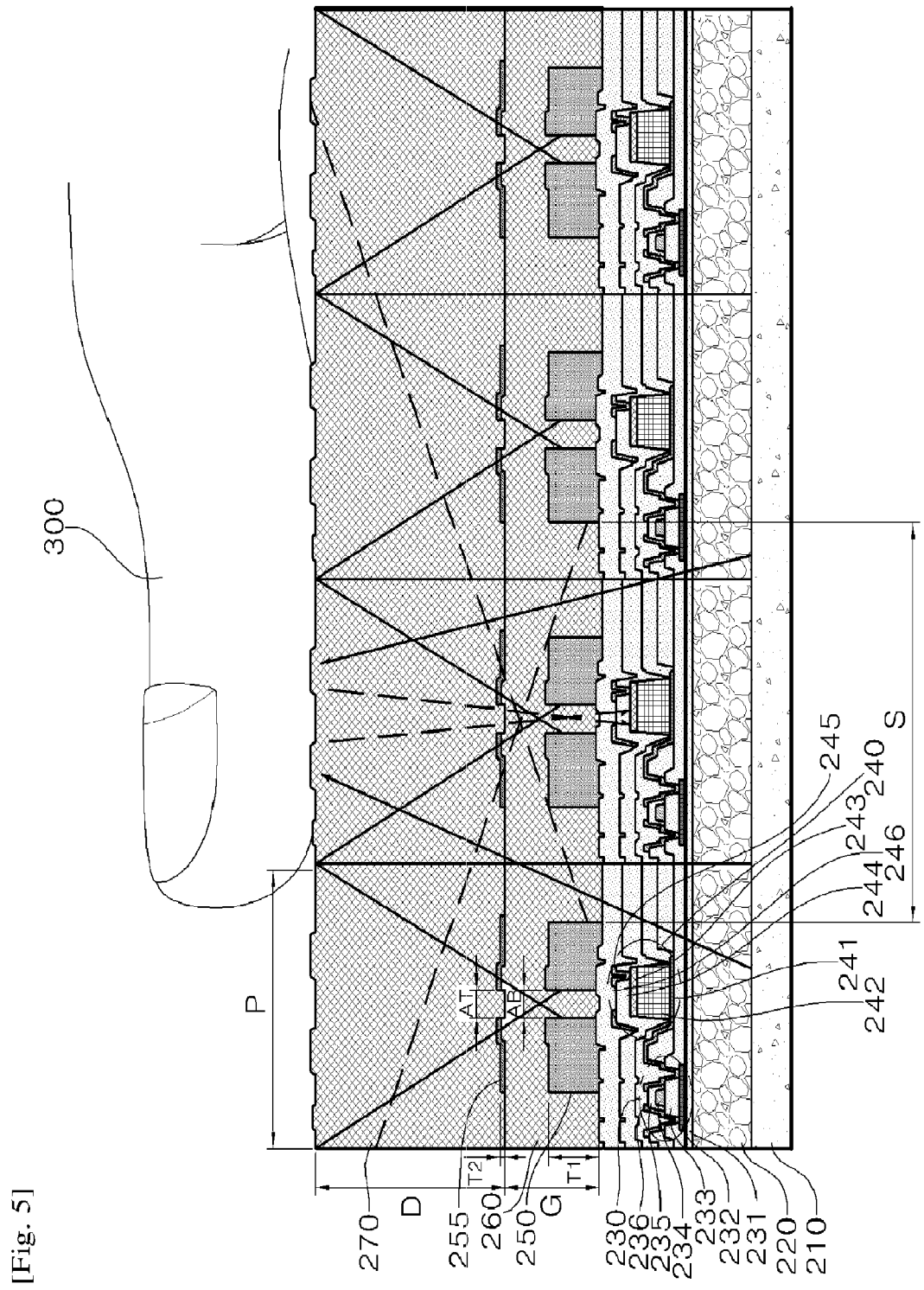
[Fig. 5]

OPTICAL FINGERPRINT SENSOR

CROSS REFERENCE TO PRIOR APPLICATIONS

This application is a National Stage Application of PCT International Patent Application No. PCT/KR2014/008652 filed on Sep. 17, 2014, under 35 U.S.C. §371, which claims priority to Korean Patent Application No. 10-2013-0111575 filed on Sep. 17, 2013, which are all hereby incorporated by reference in their entirety.

TECHNICAL FIELD

Embodiments of the present invention relate to an optical fingerprint sensor.

BACKGROUND

Recently, a capacitive type and an optical type are widely used in a fingerprint sensor.

In general, a capacitive type fingerprint sensor recognizes a fingerprint by sensing capacitance formed by a fingerprint of the human body using a semiconductor device sensitive to a voltage and current. An optical type fingerprint sensor has an advantage of good durability and is configured to include an optical source and an optical sensor. The optical sensor is configured to sense a fingerprint of a user by sensing light emitted from the optical source.

FIG. 1 is a cross-sectional view of a conventional optical fingerprint sensor.

As shown in FIG. 1, in the conventional optical fingerprint sensor, an optical source 110 and an optical sensor 120 are disposed at a specific distance and angle. When light 111 from the optical source 110 is reflected by a fingerprint 130 of a user, the optical sensor 120 can obtain the form of the fingerprint 130 by sensing the light 111 reflected by the fingerprint 130.

If the distance between a fingerprint and a surface of the sensor is distant, however, the conventional optical fingerprint sensor is configured so that pieces of light reflected by adjacent fingerprints are easy to be introduced.

Accordingly, the conventional optical fingerprint sensor had a problem in that it did not obtain a clear fingerprint image because pieces of light reflected from fingerprints are mixed if the distance between a fingerprint and a surface of a sensor is 10 um or more.

DISCLOSURE

Technical Problem

The present invention has been made keeping in mind the above problems occurring in the prior art, and an object of the present invention is to obtain a fingerprint image of high quality even in an indoor environment by making clear the fingerprint image in such a manner that a pin hole lens is disposed on a photosensor unit so that light radiated from a backlight unit is reflected by a fingerprint, only light that belongs to pieces of light reflected by the fingerprint and that is reflected by a fingerprint at a position vertically symmetrical to the pin hole lens is transmitted, and other pieces of introduced light are blocked in the configuration of an optical fingerprint sensor for obtaining an image of a fingerprint of a user in response to brightness of light.

Technical Solution

An optical fingerprint sensor according to the present embodiment for solving the aforementioned problem is configured to include a backlight unit radiating light; a first pin hole lens having a hole formed therein, transmitting light radiated from the backlight unit and reflected by a fingerprint of a user vertically symmetrical to the hole, and blocking light other than the light; and a photosensor unit disposed under the first pin hole lens and sensing light passing through the hole of the first pin hole lens.

In accordance with another embodiment of the present invention, the optical fingerprint sensor may be configured to further include a thin film transistor switching a signal generated by the photosensor unit.

In accordance with another embodiment of the present invention, the thin film transistor may include any one of Coplanar, staggered, inverted Coplanar, and inverted staggered thin film transistors.

In accordance with another embodiment of the present invention, the thin film transistor may be configured to include a substrate; a buffer layer formed over the substrate; a semiconductor active layer formed over the buffer layer; a gate insulating film formed over the semiconductor active layer; a gate electrode formed over the gate insulating film; an interlayer dielectric film formed over the gate electrode; and a source electrode and a drain electrode formed in a via hole formed in the gate insulating film and the interlayer dielectric film.

In accordance with another embodiment of the present invention, the semiconductor active layer may include at least one of a low-temperature polycrystalline silicon semiconductor, an amorphous silicon semiconductor, and an oxide semiconductor.

In accordance with another embodiment of the present invention, the substrate may include any one of an insulating substrate, a glass substrate, and a metal substrate.

In accordance with another embodiment of the present invention, the photosensor unit may be configured to include a photosensor formed over an electrode extended from the drain electrode of the thin film transistor; a transparent electrode formed over the photosensor; a passivation layer formed over the transparent electrode; and a bias electrode formed in the via hole formed in the passivation layer and connected to the transparent electrode.

In accordance with another embodiment of the present invention, the photosensor may include any one of an amorphous silicon photodiode, an organic photosensor, and quantum dots.

In accordance with another embodiment of the present invention, the optical fingerprint sensor may be configured to further include a first passivation insulating film formed over the first pin hole lens.

In accordance with another embodiment of the present invention, the optical fingerprint sensor may be configured to further include a second pin hole lens formed over the first passivation insulating film.

In accordance with another embodiment of the present invention, the optical fingerprint sensor may be configured to further include a second passivation insulating film formed over the second pin hole lens.

In accordance with another embodiment of the present invention, at least one of the first pin hole lens and the second pin hole lens may be made of metal or an organic material.

Advantageous Effects

In accordance with an embodiment of the present invention, in the configuration of an optical fingerprint sensor for obtaining an image of a fingerprint of a user in response to brightness of light, the pin hole lens is disposed on the photosensor unit so that light radiated from the backlight unit is reflected by a fingerprint, only light that belongs to pieces of light reflected by the fingerprint and that is reflected by a fingerprint at a position vertically symmetrical to the pin hole lens is transmitted, and other pieces of introduced light are blocked. Accordingly, a fingerprint image of high quality can be obtained even in an indoor environment by making clear the fingerprint image.

DESCRIPTION OF DRAWING

FIG. 1 is a cross-sectional view of a conventional optical fingerprint sensor.

FIG. 2 is a cross-sectional view of an optical fingerprint sensor in accordance with an embodiment of the present invention.

FIG. 3 is a cross-sectional view of an optical fingerprint sensor in accordance with another embodiment of the present invention.

FIG. 4 is a cross-sectional view of an optical fingerprint sensor in accordance with yet another embodiment of the present invention.

FIG. 5 is a cross-sectional view of an optical fingerprint sensor in accordance with yet another embodiment of the present invention.

MODE FOR INVENTION

Hereinafter, a preferred embodiment of the present invention is described in detail with reference to the accompanying drawings. In describing embodiments, a detailed description of a related known function or element will be omitted if it is deemed to make the gist of the present invention unnecessarily vague. Furthermore, the size of each element in the drawings may be exaggerated for a description and does not mean a practical size.

FIG. 2 is a cross-sectional view of an optical fingerprint sensor in accordance with an embodiment of the present invention.

The optical fingerprint sensor in accordance with an embodiment of the present invention is described with reference to FIG. 2.

As shown in FIG. 2, the optical fingerprint sensor in accordance with an embodiment of the present invention includes a backlight unit 210, a photosensor unit 240, and a first pin hole lens 250 and may be configured to further include a thin film transistor 230.

The backlight unit 210 radiates light upward.

The thin film transistor 230 switches a signal generated by the photosensor unit 240 and is configured to include a substrate 220, a buffer layer 231, a semiconductor active layer 232, a gate insulating film 233, a gate electrode 234, an interlayer dielectric film 235, a source electrode 236 and a drain electrode 237. The thin film transistor 230 is formed over the backlight unit 210.

The thin film transistor 230 may include any one of Coplanar, staggered, inverted Coplanar, and inverted staggered thin film transistors.

More specifically, the substrate 220 of the thin film transistor 230 is formed on the backlight unit 210. The buffer layer 231 is formed on the substrate 220. The semiconductor active layer 232 is formed on the buffer layer 231.

In this case, the substrate 220 may be formed of any one of an insulating substrate, a glass substrate, and a metal substrate. The semiconductor active layer 232 may include any one of a low-temperature polycrystalline silicon semiconductor, an amorphous silicon semiconductor, and an oxide semiconductor.

Furthermore, the gate insulating film 233 is formed on the semiconductor active layer 232. The gate electrode 234 is formed on the gate insulating film 233. The interlayer dielectric film 235 is formed on the gate electrode 234. In this case, a via hole is formed in the gate insulating film 233 and the interlayer dielectric film 235, thereby forming the source electrode 236 and the drain electrode 237.

The photosensor unit 240 is disposed under the first pin hole lens 250 and senses light passing through the hole of the first pin hole lens 250.

The photosensor unit 240 is configured to include a photosensor 242, a transparent electrode 243, a passivation layer 244, a bias electrode 245, and a second passivation layer 246.

More specifically, the photosensor 242 is formed on an electrode 241 extended from the drain electrode 237 of the thin film transistor 230. The transparent electrode 243 is formed on the photosensor 242. The passivation layer 244 is formed on the transparent electrode 243. The bias electrode 245 is formed in the via hole formed in the passivation layer 244 and connected to the transparent electrode 243. The second passivation layer 246 is formed over the passivation layer 244 and the bias electrode 245.

In this case, the photosensor 242 may include any one of an amorphous silicon photodiode, an organic photosensor, and quantum dots.

The first pin hole lens 250 is formed on the second passivation layer 246. A hole which transmits light radiated from the backlight unit 210 and reflected by a fingerprint 300 of a user is formed in the first pin hole lens 250.

That is, when light is radiated from the backlight unit 210, only light reflected by the fingerprint 300 of the user at a position vertically symmetrical to the first pin hole lens 250 is transmitted, the transmitted light is incident on the photosensor unit 244, so the photosensor unit 244 can generate a charge signal. Furthermore, when light other than light reflected by the fingerprint 300 of the user at the position vertically symmetrical to the first pin hole lens 250 is incident on the first pin hole lens 250, the incident light is reflected within the hole of the first pin hole lens 250, thus becoming weakened, or is absorbed by the first pin hole lens 250, thus not being incident on the photosensor unit 244.

Meanwhile, a first passivation insulating film 260 is formed on a top surface of the first pin hole lens 250 configured as described above. In this case, the first pin hole lens 250 may be made of metal or an organic material.

A pitch P of each pixel of the optical fingerprint sensor configured as described above may be formed by the following equation 1.

$$P = A\left(\frac{2D}{T} - 1\right) \qquad \text{[Equation 1]}$$

In this case, P is the pitch of the optical fingerprint sensor, A is the diameter of the hole of the first pin hole lens 250, T is the thickness of the first pin hole lens 250, and D is the thickness of the first passivation insulating film 260.

If the optical fingerprint sensor is configured as in Equation 1, a focus is adjusted by control of the height with which a fingerprint comes in contact. Accordingly, light radiated from the backlight unit 210 can be accurately incident on and sensed by the photosensor unit 240.

FIG. 3 is a cross-sectional view of an optical fingerprint sensor in accordance with another embodiment of the present invention.

The optical fingerprint sensor in accordance with another embodiment of the present invention is described with reference to FIG. 3.

As shown in FIG. 3, the optical fingerprint sensor in accordance with another embodiment of the present invention, like the embodiment of FIG. 2, includes the backlight unit 210, the photosensor unit 240, and the first pin hole lens 250 and may be configured to further include the thin film transistor 230.

The substrate 220 is formed on the backlight unit 210. The buffer layer 231 is formed on the substrate 220. The semiconductor active layer 232 of the thin film transistor 230 is formed on the buffer layer 231.

The gate insulating film 233 is formed on the semiconductor active layer 232. The gate electrode 234 is formed on the gate insulating film 233. The interlayer dielectric film 235 is formed on the gate electrode 234. In this case, a via hole is formed in the gate insulating film 233 and the interlayer dielectric film 235, so the source electrode 236 and the drain electrode 237 are formed in the via hole.

In this case, in the embodiment of FIG. 3, the electrode 241 extended from the drain electrode 237 is formed on the gate insulating film 233, so the photosensor 242 is formed on the electrode 241 on the gate insulating film 233.

Furthermore, as in the embodiment of FIG. 2, the photosensor unit 240 is configured to include the photosensor 242, the transparent electrode 243, the passivation layer 244, the bias electrode 245, and the second passivation layer 246.

The first pin hole lens 250 is formed on the second passivation layer 246. The hole which transmits light radiated from the backlight unit 210 and reflected by the fingerprint 300 of the user is formed in the first pin hole lens 250.

Meanwhile, the first passivation insulating film 260 is formed on a top surface of the first pin hole lens 250 configured as described above.

FIG. 4 is a cross-sectional view of an optical fingerprint sensor in accordance with yet another embodiment of the present invention.

The optical fingerprint sensor in accordance with yet another embodiment of the present invention is described with reference to FIG. 4.

As shown in FIG. 4, the optical fingerprint sensor in accordance with yet another embodiment of the present invention also includes the backlight unit 210, the photosensor unit 240, and the first pin hole lens 250 and may be configured to further include the thin film transistor 230.

The backlight unit 210 radiates light upward. The thin film transistor 230 switches a pixel signal and is configured to include the substrate 220, the buffer layer 231, the semiconductor active layer 232, the gate insulating film 233, the gate electrode 234, the interlayer dielectric film 235, the source electrode 236, and the drain electrode 237. The thin film transistor 230 is formed over the backlight unit 210.

The gate insulating film 233 is formed on the semiconductor active layer 232. The gate electrode 234 is formed on the gate insulating film 233. The interlayer dielectric film 235 is formed on the gate electrode 234. In this case, a via hole is formed in the gate insulating film 233 and the interlayer dielectric film 235. The source electrode 236 and the drain electrode 237 are formed in the via hole.

The photosensor unit 240 is configured to include the photosensor 242, the transparent electrode 243, the passivation layer 244, the bias electrode 245, and the second passivation layer 246.

More specifically, the photosensor 242 is formed on the electrode 241 extended from the drain electrode 237 of the thin film transistor 230. The transparent electrode 243 is formed on the photosensor 242. The passivation layer 244 is formed on the transparent electrode 243. The bias electrode 245 is formed in a via hole formed in the passivation layer 244 and is connected to the transparent electrode 243. The second passivation layer 246 is formed over the passivation layer 244 and the bias electrode 245.

The first pin hole lens 250 is disposed over the photosensor unit 240. The first passivation insulating film 260 is formed on the first pin hole lens 250. A second pin hole lens 255 is formed on the first passivation insulating film 260. A second passivation insulating film 270 is formed on the second pin hole lens 255.

A hole which transmits light radiated from the backlight unit 210 and reflected by the fingerprint 300 of the user is formed in the first pin hole lens 250 and the second pin hole lens 255.

That is, when light is radiated from the backlight unit 210, light radiated and reflected by the fingerprint 300 of the user and reflected by the fingerprint 300 of the user at a position vertically symmetrical to the first pin hole lens 250 and the second pin hole lens 255 is incident on the photosensor unit 244 through the hole of the first pin hole lens 250 and the second pin hole lens 255, so the photosensor unit 244 can sense the fingerprint 300 of the user. Furthermore, when light other than the light reflected by the fingerprint 300 of the user at the position vertically symmetrical to the first pin hole lens 250 and the second pin hole lens 255 is incident on the first pin hole lens 250 and the second pin hole lens 255, the incident light is reflected within the hole of the first pin hole lens 250 and the second pin hole lens 255, thus becoming weakened, or is absorbed by the first pin hole lens 250, thus not being incident on the photosensor unit 244.

Meanwhile, the first pin hole lens 250 and the second pin hole lens 255 may be made of metal or an organic material.

In this case, a spread width S, that is, the distance between the first pin hole lenses 250 on both sides, from the first pin hole lens 250 that becomes the center is set in order to prevent light passing through the hole of the first pin hole lens 250, that is, the center, from influencing an adjacent photosensor unit or pin hole lens. The spread width S may be calculated by the following equation 2.

$$S = \frac{2G \times AT}{T1 + T2} \quad \text{[Equation 2]}$$

In this case, S is the spread width, that is, the distance between the first pin hole lenses 250 on both sides, from a single first pin hole lens 250 that becomes the center. G is the thickness of the first passivation insulating film 260, AT is the width of the hole of the second pin hole lens 255, T1 is the thickness of the first pin hole lens 250, and T2 is the thickness of the second pin hole lens 255.

Furthermore, the pitch P of each pixel of the optical fingerprint sensor configured as described above may be formed by the following equation 3.

$$P = \frac{D}{G}(AB + AT) - AT \quad \text{[Equation 3]}$$

In this case, P is the pitch of the optical fingerprint sensor, G is the thickness of the first passivation insulating film 260, D is the thickness of the second passivation insulating film 270, AB is the width of the hole of the first pin hole lens 250, AT is the width of the hole of the second pin hole lens 255, and the pitch P of the optical fingerprint sensor may be calculated by Equation 3.

If the optical fingerprint sensor is configured as in Equation 3, a focus is adjusted by control of the height with which a fingerprint comes in contact. Accordingly, light radiated from the backlight unit 210 can be accurately incident on and sensed by the photosensor unit 240.

FIG. 5 is a cross-sectional view of an optical fingerprint sensor in accordance with yet another embodiment of the present invention.

The optical fingerprint sensor in accordance with yet another embodiment of the present invention is described with reference to FIG. 5.

As shown in FIG. 5, the optical fingerprint sensor in accordance with yet another embodiment of the present invention, as in the embodiment of FIG. 4, includes the backlight unit 210, the photosensor unit 240, and the first pin hole lens 250 and may be configured to further include the thin film transistor 230.

Furthermore, the gate insulating film 233 is formed on the semiconductor active layer 232 of the thin film transistor 230. The gate electrode 234 is formed on the gate insulating film 233. The interlayer dielectric film 235 is formed on the gate electrode 234. In this case, a via hole is formed in the gate insulating film 233 and the interlayer dielectric film 235. The source electrode 236 and the drain electrode 237 are formed in the via hole.

In this case, in the embodiment of FIG. 5, the electrode 241 extended from the drain electrode 237 is formed on the gate insulating film 233, so the photosensor 242 is formed on the electrode 241 on the gate insulating film 233.

Furthermore, as in the embodiment of FIG. 4, the photosensor unit 240 is configured to include the photosensor 242, the transparent electrode 243, the passivation layer 244, the bias electrode 245, and the second passivation layer 246.

The first pin hole lens 250 is disposed over the photosensor unit 240. The first passivation insulating film 260 is formed on the first pin hole lens 250. The second pin hole lens 255 is formed on the first passivation insulating film 260. The second passivation insulating film 270 is formed on the second pin hole lens 255.

A hole which transmits light radiated from the backlight unit 210 and radiated by the fingerprint 300 of the user is formed in the first pin hole lens 250 and the second pin hole lens 255.

As described above, in accordance with an embodiment of the present invention, in the configuration of the optical fingerprint sensor for sensing a fingerprint of a user in response to brightness of light, the pin hole lens is disposed on the photosensor unit. Only light that belongs to pieces of light radiated from the backlight unit and that is reflected by a fingerprint of a user at a position vertically symmetrical to the pin hole lens is incident on the photosensor unit through the pin hole lens, so the fingerprint of the user is sensed. Light other than the light reflected by the fingerprint of the user at the position vertically symmetrical to the pin hole lens is reflected within the hole of the pin hole lens, thus becoming weakened, or is absorbed, thus not being incident on the photosensor unit. Accordingly, a fingerprint image of high quality can be obtained even in an indoor environment.

In the detailed description of the present invention, detailed embodiments have been described. However, the present invention may be modified in various ways without departing from the scope of the present invention. Accordingly, the technical spirit of the present invention should not be limited to the aforementioned embodiments, but should be defined by the appended claims and equivalent thereof.

The invention claimed is:

1. An optical fingerprint sensor, comprising:
a backlight unit radiating light;
a first pin hole lens having a hole formed therein, transmitting light radiated from the backlight unit and reflected by a fingerprint of a user vertically symmetrical to the hole, and blocking light other than the light;
a photosensor unit disposed under the first pin hole lens and sensing light passing through the hole of the first pin hole lens; and
a first passivation insulating film formed over the first pin hole lens,
wherein a pitch (P) of each pixel of the optical fingerprint sensor is calculated by the following Equation 1:

$$P = A\left(\frac{2D}{T} - 1\right) \quad \text{[Equation 1]}$$

wherein P is the pitch of each pixel of the optical fingerprint sensor, A is a diameter of the hole of the first pin hole lens, T is a thickness of the first pin hole lens, and D is a thickness of the first passivation insulating film.

2. The optical fingerprint sensor of claim 1, further comprising a thin film transistor switching a signal generated by the photosensor unit.

3. The optical fingerprint sensor of claim 2, wherein the thin film transistor comprises any one of Coplanar, staggered, inverted Coplanar, and inverted staggered thin film transistors.

4. The optical fingerprint sensor of claim 2, wherein the thin film transistor comprises:
a substrate;
a buffer layer formed over the substrate;
a semiconductor active layer formed over the buffer layer;
a gate insulating film formed over the semiconductor active layer;
a gate electrode formed over the gate insulating film;
an interlayer dielectric film formed over the gate electrode; and
a source electrode and a drain electrode formed in a via hole formed in the gate insulating film and the interlayer dielectric film.

5. The optical fingerprint sensor of claim 4, wherein the semiconductor active layer is any one of a low-temperature polycrystalline silicon semiconductor, an amorphous silicon semiconductor, and an oxide semiconductor.

6. The optical fingerprint sensor of claim 4, wherein the substrate is any one of an insulating substrate, a glass substrate, and a metal substrate.

7. The optical fingerprint sensor of claim 4, wherein the photosensor unit comprises:
a photosensor formed over an electrode extended from the drain electrode of the thin film transistor;
a transparent electrode formed over the photosensor;
a passivation layer formed over the transparent electrode; and
a bias electrode formed in the via hole formed in the passivation layer and connected to the transparent electrode.

8. The optical fingerprint sensor of claim 7, wherein the photosensor comprises any one of an amorphous silicon photodiode, an organic photosensor, and quantum dots.

9. The optical fingerprint sensor of claim 1, further comprising a second pin hole lens formed over the first passivation insulating film.

10. The optical fingerprint sensor of claim 9, further comprising a second passivation insulating film formed over the second pin hole lens.

11. The optical fingerprint sensor of claim 9, wherein at least one of the first pin hole lens and the second pin hole lens is made of metal or an organic material.

* * * * *